United States Patent
Watanabe et al.

(10) Patent No.: US 8,732,029 B2
(45) Date of Patent: May 20, 2014

(54) COMPONENT SALES SYSTEM, ELECTRONIC STORE PROVIDING DEVICE, CONTROL METHOD, AND PROGRAM

(75) Inventors: Hideyuki Watanabe, Tokyo (JP); Takaharu Hiroe, Tokyo (JP); Keisuke Mori, Tokyo (JP); Ren Ishii, Sagamihara (JP)

(73) Assignee: Mitsubishi Nichiyu Forklift Co., Ltd., Kyoto (JP)

( * ) Notice: Subject to any disclaimer, the term of this patent is extended or adjusted under 35 U.S.C. 154(b) by 0 days.

(21) Appl. No.: 13/389,566

(22) PCT Filed: Jul. 23, 2010

(86) PCT No.: PCT/JP2010/062446
§ 371 (c)(1),
(2), (4) Date: Apr. 26, 2012

(87) PCT Pub. No.: WO2011/121806
PCT Pub. Date: Oct. 6, 2011

(65) Prior Publication Data
US 2012/0271736 A1    Oct. 25, 2012

(30) Foreign Application Priority Data
Mar. 31, 2010   (JP) ............................. P2010-081349

(51) Int. Cl.
*G06Q 30/00*    (2012.01)

(52) U.S. Cl.
USPC ...................................................... 705/26.1

(58) Field of Classification Search
USPC ...................................................... 705/26.1
See application file for complete search history.

(56) References Cited

U.S. PATENT DOCUMENTS

2004/0122625 A1*  6/2004  Nasser et al. ................. 702/185

FOREIGN PATENT DOCUMENTS

| CN | 101206750 A | 6/2008 |
|---|---|---|
| JP | 2001-256382 A | 9/2001 |
| JP | 2002-099550 A | 4/2002 |
| JP | 2002-203149 A | 7/2002 |
| JP | 2002-304460 A | 10/2002 |
| JP | 2003-067608 A | 3/2003 |
| JP | 2004-21296 A | 1/2004 |
| JP | 2004-287486 A | 10/2004 |
| JP | 2005-227882 A | 8/2005 |
| JP | 2006-285505 A | 10/2006 |
| JP | 2010-015457 A | 1/2010 |

OTHER PUBLICATIONS

Chinese Office Action for Application No. 201080033993.2 mailed Feb. 6, 2013 with English Translation.
International Search Report for PCT/JP2010/062446 dated Sep. 14, 2010.

(Continued)

*Primary Examiner* — Mila Airapetian
(74) *Attorney, Agent, or Firm* — Birch, Stewart, Kolasch & Birch, LLP

(57) ABSTRACT

A component sales system sells, a plurality of components that constitutes each of a plurality of mechanisms constituting a machine at an electronic store. The component sales system includes an electronic store providing device that provides the electronic store through a communication line to a customer terminal used by a customer. The electronic store providing device includes a selected component data receiving unit, a maintenance type specifying unit, a dismounted component specifying unit, a replacement component specifying unit, a sales page generating unit, and a web page transmitting unit.

10 Claims, 14 Drawing Sheets

(56) References Cited

OTHER PUBLICATIONS

Written Opinion of the International Searching Authority for PCT/JP2010/062446 dated Sep. 14, 2010.

Japanese Office Action mailed Nov. 5, 2013 for corresponding JP Application No. 2010-081349 with an English translation.

* cited by examiner

FIG. 3

| COMPONENT ID | COMPONENT NAME | MECHANISM ID | DRAWING NUMBER | MAINTENANCE TYPE ID | NECESSITY OF REPLACEMENT | TOOL ID | PRICE (YEN) |
|---|---|---|---|---|---|---|---|
| P001 | INJECTOR | ME001 | 1 | MA001 | NO | T001, T002 | 3000 |
| P002 | INJECTION PIPE | ME002 | 2, 3, 4, 5, 6, 7 | MA001 | YES | - | 5000 |
| P003 | PRESSURE PLATE | ME003 | 2 | MA002 | NO | T003, T004, T005 | 40000 |
| ......... | ......... | ......... | ......... | ......... | ......... | ......... | ......... |

| TOOL ID | TOOL NAME | PRICE (YEN) |
|---|---|---|
| T001 | INJECTOR-EXTRACTOR ADAPTER | 9000 |
| T002 | NOZZLE EXTRACTOR | 9000 |
| T003 | BOLT | 1000 |
| ⋮ | ⋮ | ⋮ |

| MAINTENANCE TYPE ID | MAINTENANCE TYPE NAME | DISMOUNTING ORDER | HOURS WORKED (h) |
|---|---|---|---|
| MA001 | MAINTENANCE OF INJECTOR | 1. P002<br>2. P003<br>3. P004<br>4. P005<br>5. P001<br>⋮ | 6.5 |
| MA002 | MAINTENANCE OF PRESSURE PLATE ASSEMBLY | 1. P006<br>2. P007<br>3. P008<br>⋮ | 0.4 |
| MA003 | MAINTENANCE OF COMMON RAIL | 1. P009<br>2. P010<br>3. P011<br>⋮ | 0.3 |
| ⋮ | ⋮ | ⋮ | ⋮ |

FIG. 8

- IF YOU CLICK WITHIN THE AREA OF DESIRED COMPONENT, THEN YOU WILL BE ABLE TO SEE OTHER NECESSARY COMPONENTS AND TOOLS.
- PLEASE SELECT DESIRED COMPONENT AND ADD IT TO A CART.
- AFTER PUTTING ALL DESIRED COMPONENTS INTO THE CART, PLEASE SETTLEMENT OF THE CART.

| DRAWING NUMBER | COMPONENT NAME | PRICE (YEN) | SELECT TO PURCHASE |
|---|---|---|---|
| 1 | INJECTOR | 3000 | ☐ |
| 2 | SEAL | 2000 | ☐ |
| 3 | BRIDGE | 20000 | ☐ |
| ...... | ...... | ...... | ...... |

ADD TO SHOPPING CART

SETTLEMENT OF SHOPPING CART

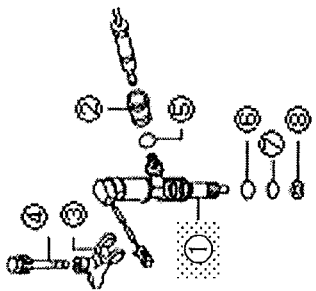
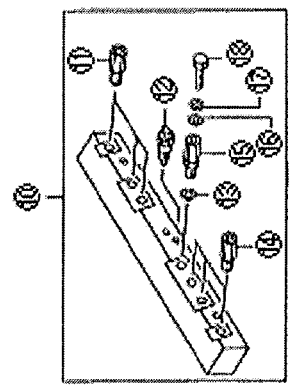

FIG. 10

- PLEASE SELECT DESIRED TOOL AND ADD IT TO A CART.
- AFTER PUTTING ALL DESIRED COMPONENTS AND TOOLS INTO THE CART, PLEASE MAKE SETTLEMENT OF THE CART.

| DRAWING NUMBER | COMPONENT NAME | PRICE (YEN) | SELECT TO PURCHASE |
|---|---|---|---|
| 1 | INJECTOR-EXTRACTOR ADAPTER | 9000 | ☐ |
| 2 | NOZZLE EXTRACTOR | 9000 | ☐ |

ADD TO SHOPPING CART

SETTLEMENT OF SHOPPING CART

FIG. 12

ESTIMATE

| COMPONENT OR TOOL NAME | QUANTITY OR HOURES WORKED | UNIT PRICE (YEN) | SUM (YEN) |
|---|---|---|---|
| INJECTOR | 1 | 3000 | 3000 |
| INJECTION PIPE | 6 | 5000 | 30000 |
| INJECTOR-EXTRACTOR ADAPTER | 1 | 9000 | 9000 |
| NOZZLE EXTRACTOR | 1 | 9000 | 9000 |
| MAINTENANCE OF INJECTOR | 6.5 | 10000 | 65000 |

SUBTOTAL   (YEN)
PRE-TAX: 116000
CONSUMPTION TAX: 5800
TOTAL: 121800

COMPONENT SALES SYSTEM, ELECTRONIC STORE PROVIDING DEVICE, CONTROL METHOD, AND PROGRAM

BACKGROUND OF THE INVENTION

1. Field of the Invention

The present invention relates to a component sales system, an electronic store providing device, a control method, and a program. More specifically, the present invention relates to a component sales system that sells, at an electronic store, a plurality of components that further constitutes each of a plurality of mechanisms constituting a machine, an electronic store providing device that provides the electronic store through a communication line to a customer terminal used by a customer, a control method for controlling the electronic store providing device, and a program for the electronic store providing device.

Priority is claimed on Japanese Patent Application No. 2010-081349, filed Mar. 31, 2010, the content of which is incorporated herein by reference.

2. Description of Related Art

A component ordering system that orders replacement components for a delivered device (for example, Patent Document 1) is known. In this system, a replacement component is specified using an image showing an exploded structure of the device. In this case, a component to be ordered can be selected by selecting a target component within the image showing the exploded structure.

However, in the case of machine maintenance, in many cases, once a certain component is replaced, it is necessary to dismount a plurality of other components. In this case, among the plurality of dismounted other components, there is also a component which is recommended to be replaced with a new one once it is dismounted.

PRIOR ART DOCUMENT

Patent Document

Patent Document 1: Japanese Unexamined Patent Application, First Publication No. 2002-203149

SUMMARY OF THE INVENTION

Problems to be Solved by the Invention

According to the component ordering system described in Patent Document 1, a component to be ordered can be selected by selecting a target component within the image showing the exploded structure. However, this system can order only a component selected by a customer. Thus, when purchasing other components together with a desired component using this system, the customer perform an operation of purchasing the desired component, after that, the customer has to perform an additional operation of finding the other components to be purchased and purchasing the components, which is time-consuming.

Moreover, in the component ordering system described in Patent Document 1, when the customer forgets about the presence of components to be replaced together as described above or does not understand even the presence thereof, the customer is highly likely not to order the necessary components other than the desired component.

Means for Solving the Problem

In order to solve the above problems, according to a first aspect of the present invention, there is provided a component sales system that sells, at an electronic store, a plurality of components that constitutes each of a plurality of mechanisms constituting a machine, comprising: an electronic store providing device that provides the electronic store through a communication line to a customer terminal used by a customer, wherein the electronic store providing device includes: a selected component data receiving unit that receives a data of representing one component selected by the customer among a plurality of components constituting one of the mechanisms, from the customer terminal, a maintenance type specifying unit that specifies the type of maintenance for replacing a component represented by the data received by the selected component data receiving unit; a dismounted component specifying unit that specifies other components dismounted together with the component at the scope of a work for replacing the component represented by the data received by the selected component data receiving unit among works included in the maintenance type specified by the maintenance type specifying unit; a replacement component specifying unit that specifies a component needs to be replaced together among the components specified by the dismounted component specifying unit; a sales page generating unit that generates a web page for selling the component represented by the data received by the selected component data receiving unit and the component specified by the replacement component specifying unit, to the customer; and a web page transmitting unit that transmits the web page generated by the sales page generating unit to the customer terminal which is a source of the data received by the selected component data receiving unit.

The sales page generating unit may generate a web page configured to allow the customer to understand each of the component represented by the data received by the selected component data receiving unit and the component specified by the replacement component specifying unit corresponds to each component among the components constituting each mechanism.

The electronic store providing device may further include a tool specifying unit that specifies a tool to be prepared to dismount the component represented by the data received by the selected component data receiving unit and the components specified by the dismounted component specifying unit, and the sales page generating unit may generate a web page for selling the tool specified by the tool specifying unit concurrently to the customer.

The electronic store providing device may further include a work flow page generating unit that generates a web page including digital contents representing the flow of a work at the maintenance type specified by the maintenance type specifying unit, and the web page transmitting unit may transmit the web page generated by the work flow page generating unit additionally to the customer terminal corresponding to the transmission source of the data received by the selected component data receiving unit.

The electronic store providing device may further include an estimate calculating unit that calculates an estimate for the work of replacing the components using the price of the component represented by the data received by the selected component data receiving unit and the price of the component specified by the replacement component specifying unit, and an estimate page generating unit that generates a web page for presenting information on the estimate calculated by the estimate calculating unit to the customer, and the web page transmitting unit may transmit the web page generated by the estimate page generating unit concurrently to the customer terminal corresponding to the transmission source of the data received by the selected component data receiving unit.

The estimate calculating unit may calculate the estimate further using the price of the tool specified by the tool specifying unit.

The estimate calculating unit may calculate the estimate further using working hours required for the maintenance, determined based on the maintenance type specified by the maintenance type specifying unit.

According to a second aspect of the present invention, there is provided an electronic store providing device that provides, through a communication line, an electronic store that sells a plurality of components that constitutes each of a plurality of mechanisms constituting a machine to a customer terminal used by a customer, including: a selected component data receiving unit that receives a data of representing one component selected by the customer among a plurality of components constituting one of the mechanisms, from the customer terminal, a maintenance type specifying unit that specifies the type of maintenance for replacing a component represented by the data received by the selected component data receiving unit; a dismounted component specifying unit that specifies other components dismounted together with the component at the scope of a work for replacing the component represented by the data received by the selected component data receiving unit among works included in the maintenance type specified by the maintenance type specifying unit; a replacement component specifying unit that specifies a component needs to be replaced together among the components specified by the dismounted component specifying unit; a sales page generating unit that generates a web page for selling the component represented by the data received by the selected component data receiving unit and the component specified by the replacement component specifying unit, to the customer; and a web page transmitting unit that transmits the web page generated by the sales page generating unit to the customer terminal which is a source of the data received by the selected component data receiving unit.

According to a third aspect of the present invention, a control method for controlling an electronic store providing device that provides, through a communication line, an electronic store that sells a plurality of components that constitutes each of a plurality of mechanisms constituting a machine to a customer terminal used by a customer, including: a selected component data receiving step of receiving a data of representing one component selected by the customer among a plurality of components constituting one of the mechanisms, from the customer terminal; a maintenance type specifying step of specifying the type of maintenance for replacing a component represented by the data received in the selected component data receiving step; a dismounted component specifying step of specifying other components dismounted together with the component at the scope of a work for replacing the component represented by the data received in the selected component data receiving step among works included in the maintenance type specified in the maintenance type specifying step; a replacement component specifying step of specifying a component needs to be replaced together among the components specified in the dismounted component specifying step; a sales page generating step of generating a web page for selling the component represented by the data received in the selected component data receiving step and the component specified in the replacement component specifying step, to the customer; and a web page transmitting step of transmitting the web page generated in the sales page generating step to the customer terminal which is a source of the data received in the selected component data receiving step.

According to a fourth aspect of the present invention, there is provided a program for an electronic store providing device that provides, through a communication line, an electronic store that sells a plurality of components that constitutes each of a plurality of mechanisms constituting a machine to a customer terminal used by a customer, the program causing the electronic store providing device to function as: a selected component data receiving unit that receives a data of representing one component selected by the customer among a plurality of components constituting one of the mechanisms, from the customer terminal, a maintenance type specifying unit that specifies the type of maintenance for replacing a component represented by the data received by the selected component data receiving unit; a dismounted component specifying unit that specifies other components dismounted together with the component at the scope of a work for replacing the component represented by the data received by the selected component data receiving unit among works included in the maintenance type specified by the maintenance type specifying unit; a replacement component specifying unit that specifies a component needs to be replaced together among the components specified by the dismounted component specifying unit; a sales page generating unit that generates a web page for selling the component represented by the data received by the selected component data receiving unit and the component specified by the replacement component specifying unit, to the customer; and a web page transmitting unit that transmits the web page generated by the sales page generating unit to the customer terminal which is a source of the data received by the selected component data receiving unit.

The summary of invention described above does not describe all of the necessary features of the present invention. A sub-combination of the features described above may also be the present invention.

Effects of the Invention

As obvious from the description above, according to the invention, when a customer selects a desired component, a web page for selling the component and a web page for selling components to be replaced together when the component is replaced are provided to the customer. As a result, the customer can understand the presence of components to be purchased in addition to the desired component.

BRIEF DESCRIPTION OF THE DRAWINGS

FIG. 3 is a diagram showing an example of the information in a table format, stored in a component information storage unit 111 of the web server 110.

FIG. 4 is a diagram showing an example of the information in a table format, stored in a tool information storage unit 112 of the web server 110.

FIG. 5 is a diagram showing an example of the information in a table format, stored in a maintenance type information storage unit 113 of the web server 110.

FIG. 8 is a diagram showing another example of the web page generated by the sales page generating unit 124 of the web server 110.

FIG. 10 is a diagram showing a still further example of the web page generated by the sales page generating unit 124 of the web server 110.

FIG. 12 is a diagram showing an example of a web page generated by an estimate page generating unit 127 of the web server 110.

EMBODIMENTS OF THE INVENTION

Hereinafter, an embodiment of the present invention will be described. The embodiment does not limit the invention according to the claims, and all the combinations of the features described in the embodiment are not necessarily essential to means provided by aspects of the invention.

Figure 1:
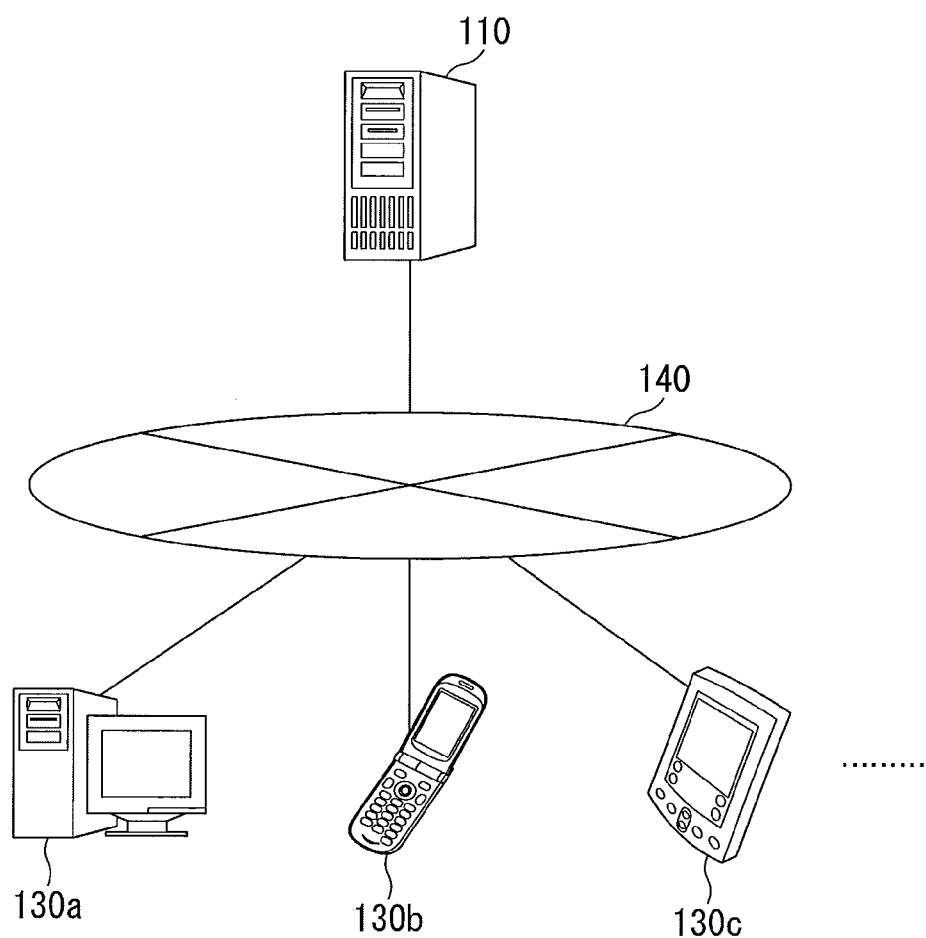
FIG. 1 is a diagram showing an example of a use environment of a component sales system 100 according to an embodiment.

FIG. 1 shows an example of a use environment of a component sales system 100 according to an embodiment. The component sales system 100 is a system that sells a plurality of components that constitutes each of a plurality of mechanisms constituting a forklift, at an electronic store. The component sales system 100 includes a web server 110, a plurality of clients 130a, 130b, 130c, . . . , (hereinafter collectively referred to as a client 130), and a communication line 140. The forklift may be an example of a "machine" in the invention. Moreover, the web server 110 may be an example of an "electronic store providing device" in the invention. Furthermore, the client 130 may be an example of a "customer terminal" in the invention.

The communication line 140 includes a computer network such as the Internet, a core network of a communication provider, and various local networks. The client 130 includes a mobile information terminal such as a mobile phone or a personal digital assistant (PDA), and a personal computer.

The web server 110 is a computer that provides an electronic store through the communication line 140 to the client 130. The web server 110 is managed by a business operator providing the component sales system 100. The client 130 is a computer that uses the electronic store provided by the web server 110 through the communication line 140. The client 130 is used by a field engineer that performs maintenance work on a forklift. The field engineer may be an example of a "customer" in the invention.

In the component sales system 100, the web server 110 receives a data representing one component selected by the field engineer among a plurality of components constituting one mechanism, from the client 130. The web server 110 specifies the type of maintenance for replacing the component represented by the received data. The web server 110 specifies other components dismounted with the component at the scope of a work for replacing the component represented by the received data among work included in the specified maintenance type. The web server 110 specifies a component to be replaced together among the specified other components. The web server 110 generates a web page for selling the component represented by the received data and the specified component to be replaced together, to the field engineer. The web server 110 transmits the generated web page to the client 130 corresponding to a transmission source of the received data.

In this way, a web page is displayed on the display of the client 130, so that a desired component selected by the field engineer and a component to be replaced together when performing an operation of replacing the component can be purchased together. As a result, the field engineer can proceed a purchasing operation while checking respective necessary components at the same time without taking the time and effort of separately finding and purchasing the component to be replaced together with the desired component. Moreover, the field engineer can understand the presence of the component needs to be replaced all at once even if the field engineer is not aware of or forgets about the presence of the component needs to be replaced with the desired component.

Moreover, in the component sales system 100, when generating the web page, the web server 110 generates a web page configured to allow the field engineer to understand that each of the component represented by the received data and the specified component corresponds to the component among the components constituting each mechanism.

When the desired component and the component to be replaced together are components that constitute the same mechanism, a web page is displayed so that it can be understood which component among a plurality of components constituting the same mechanism, each of the desired component and the component to be replaced together corresponds to is displayed on the display of the client 130, for example, in which the information representing the respective components is highlighted in different colors. Moreover, when the desired component and the component to be replaced with the desired component constitute different mechanisms of each, a web page in which the information of the desired component is highlighted in color, for example, so that it can be understood which component among a plurality of components constituting one mechanism, the desired component corresponds to, and a web page in which the information of the component to be replaced with the desired component is highlighted in color, for example, so that it can be understood which component among a plurality of components constituting the other mechanism, the component to be replaced with the desired component corresponds to is displayed on the display of the client 130. In this way, the field engineer can understand at a glance which component among a plurality of components, each of the desired component and the component to be replaced together corresponds to.

Moreover, in the component sales system 100, the web server 110 specifies a tool needs to be prepared to dismount the component represented by the received data and the other components dismounted with the component. When generating the web page, the web server 110 generates a web page for selling the specified tool concurrently to the field engineer.

In this way, a web page which can be purchased a tool necessary for replacing the desired component and the other components dismounted all at once, is displayed on the display of the client 130. As a result, the field engineer can purchase the tool without fail when the field engineer does not have a tool necessary for replacing the desired component and the other components dismounted at the same time.

Moreover, in the component sales system 100, the web server 110 generates a web page including digital contents showing the flow of a work at the specified maintenance type. When transmitting the web page, the web server 110 transmits the web page including the digital contents additionally to the client 130 corresponding to a transmission source of the received data.

In this way, a web page including the digital contents such as a slideshow, a movie, or a maintenance manual drawing, showing the work flow of replacing the desired component is displayed on the display of the client 130. As a result, a field engineer can understand the detailed flow of replacing the desired component and the component to be replaced together while viewing the digital contents such as a slideshow, a movie, or a maintenance manual drawing.

Moreover, in the component sales system 100, the web server 110 calculates an estimate for the work of replacing the components using the price of the component represented by the received data and the price of the specified component. The web server 110 generates a web page for presenting information on the calculated estimate to the field engineer. When transmitting the web page, the web server 110 transmits the web page for presenting the information on the estimate to the field engineer additionally to the client 130 corresponding to the transmission source of the received data.

In this way, a web page presenting the estimate for a case of purchasing the desired component and the component to be replaced together is displayed on the display of the client 130. As a result, the field engineer can obtain an estimate to which the price of the desired component and the price of the component to be replaced at the same time are applied without calculating the estimate for the maintenance work manually.

Moreover, in the component sales system 100, the web server 110 calculates the estimate further using the price of the tool.

In this way, a web page presenting an estimate for a case of further purchasing a tool needs to be prepared to dismount the desired component and the component to be replaced at the same time is displayed on the display of the client 130. As a result, the field engineer can obtain an estimate to which the price of the tool needs to be prepared to dismount the desired component and the component to be replaced at the same time additionally without calculating the estimate for the maintenance work manually.

Moreover, in the component sales system 100, when calculating the estimate, the web server 110 calculates the estimate further using working hours required for the maintenance, determined based on the specified maintenance type.

In this way, a web page for presenting a detailed estimate for the work of replacing the desired component is displayed on the display of the client 130. As a result, a field engineer can obtain a detailed estimate to which the working hours required for the maintenance is also applied without calculating the estimate for the maintenance work manually.

In the present embodiment, although the component sales system 100 is described as having one web server 110 for the purpose of preventing the explanation from becoming complicated, the component sales system 100 may include a plurality of web servers 110.

Figure 2:
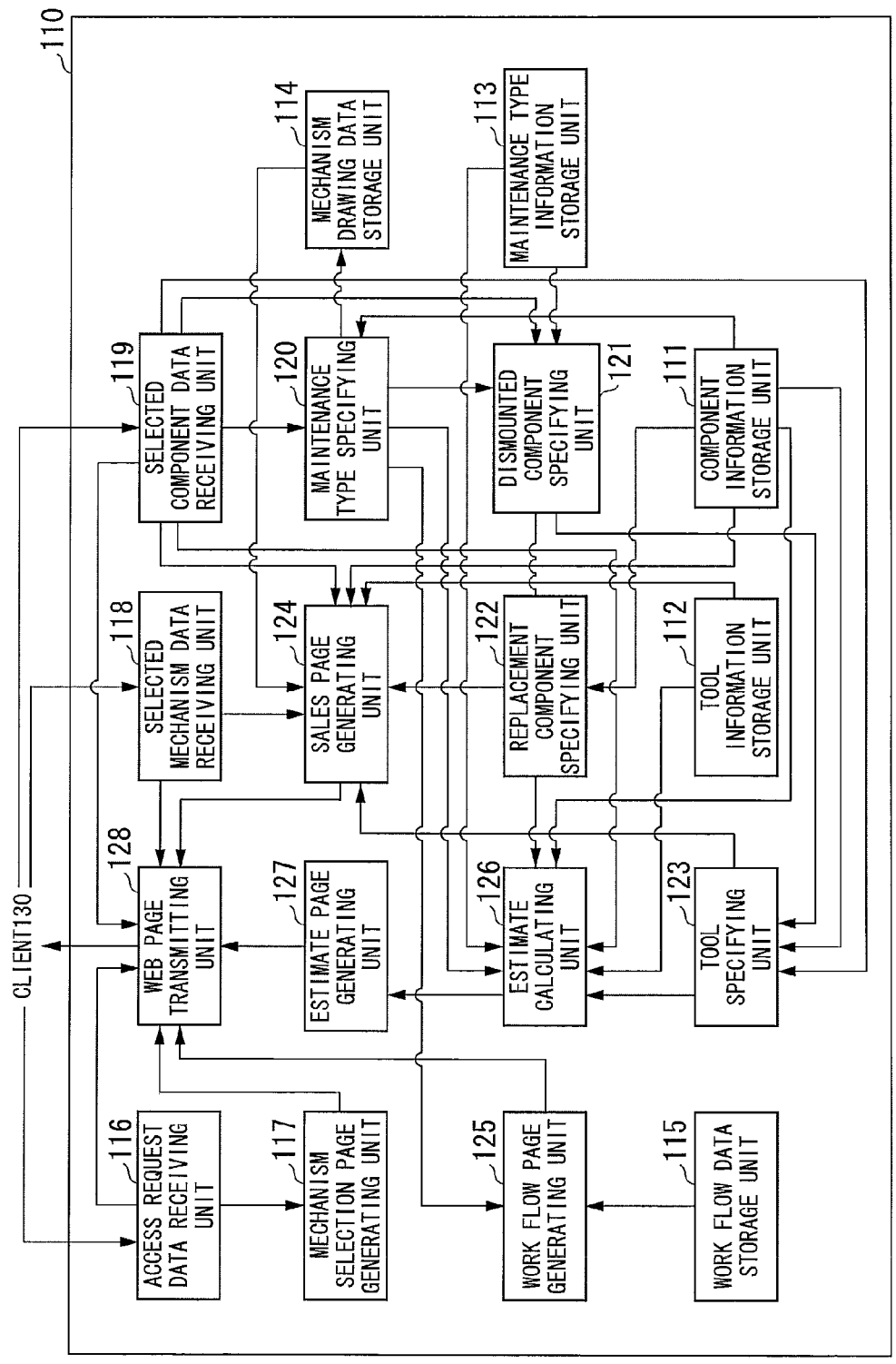
FIG. 2 is a diagram showing an example of a block configuration of a web server 110.

FIG. 2 shows an example of a block configuration of the web server 110. The web server 110 includes a component information storage unit 111, a tool information storage unit 112, a maintenance type information storage unit 113, a mechanism drawing data storage unit 114, a work flow data storage unit 115, an access request data receiving unit 116, a mechanism selection page generating unit 117, a selected mechanism data receiving unit 118, a selected component data receiving unit 119, a maintenance type specifying unit 120, a dismounted component specifying unit 121, a replacement component specifying unit 122, a tool specifying unit 123, a sales page generating unit 124, a work flow page generating unit 125, an estimate calculating unit 126, an estimate page generating unit 127, and a web page transmitting unit 128. The function and the operation of each constituent element will be described.

The access request data receiving unit 116 receives a data representing an access request to an electronic store from the client 130. Specifically, the access request data receiving unit 116 receives the data representing the access request to the electronic store from the client 130, and then transmits data representing the notice to the mechanism selection page generating unit 117. Moreover, the access request data receiving unit 116 transmits data representing the client 130 of transmission source of the received data to the web page transmitting unit 128.

The mechanism selection page generating unit 117 generates a web page for allowing a field engineer to select one mechanism among a plurality of mechanisms constituting a forklift. Specifically, the mechanism selection page generating unit 117 receiving the data representing the notice that there is an access request to the electronic store from the access request data receiving unit 116, and then generates a web page for allowing the field engineer to select one mechanism among a plurality of mechanisms constituting the forklift. The mechanism selection page generating unit 117 transmits data representing the generated web page to the web page transmitting unit 128.

The selected mechanism data receiving unit 118 receives, from the client 130, a data representing one mechanism among a plurality of mechanisms constituting the forklift selected by the field engineer. Specifically, the selected mechanism data receiving unit 118 receives the data representing one mechanism selected by the field engineer among the plurality of mechanisms constituting the forklift, from the client 130, and then transmits the data to the sales page generating unit 124. Moreover, the selected mechanism data receiving unit 118 transmits data representing the client 130 of a transmission source of the received data to the web page transmitting unit 128.

The selected component data receiving unit 119 receives, from the client 130, a data representing one component among a plurality of components constituting one mechanism selected by the field engineer. Specifically, the selected component data receiving unit 119 receives the data representing one component selected by the field engineer among a plurality of components constituting one mechanism, from the client 130, and then transmits the data to the maintenance type specifying unit 120, the dismounted component specifying unit 121, the tool specifying unit 123, the sales page generating unit 124, and the estimate calculating unit 126. Moreover, the selected component data receiving unit 119 transmits the data representing the client 130 of a transmission source of the received data to the web page transmitting unit 128.

The maintenance type specifying unit 120 specifies the type of maintenance for replacing a component represented by the data received by the selected component data receiving unit 119. Specifically, when the maintenance type specifying unit 120 receives the data representing one component selected by the field engineer among a plurality of components constituting one mechanism from the selected component data receiving unit 119, the maintenance type specifying unit 120 specifies the type of maintenance for replacing the component represented by the data using the information stored in the component information storage unit 111. The maintenance type specifying unit 120 transmits data representing the specified maintenance type to the dismounted component specifying unit 121, the work flow page generating unit 125, and the estimate calculating unit 126.

The dismounted component specifying unit 121 specifies other components dismounted together with the component at the scope of the work for replacing the component represented by the data received by the selected component data receiving unit 119 among works included in the maintenance type specified by the maintenance type specifying unit 120. Specifically, the dismounted component specifying unit 121 receives data representing one component selected by the field engineer among the plurality of components constituting one mechanism from the selected component data receiving unit 119. The dismounted component specifying unit 121 receives the data representing the maintenance type from the maintenance type specifying unit 120, and then specifies other components dismounted together with the component at the scope of the work for replacing the component represented by the data received by the selected component data receiving unit 119 among the works included in the maintenance type represented by the data using the information stored in the maintenance type information storage unit 113. The dismounted component specifying unit 121 transmits the data representing the specified components to the tool specifying unit 123 and the replacement component specifying unit 122.

The replacement component specifying unit 122 specifies a component needs to be replaced together among the components specified by the dismounted component specifying unit 121. Specifically, the replacement component specifying unit 122 receives the data representing the components from the dismounted component specifying unit 121, and then specifies a component to be replaced together among the components represented by the data using the information stored in the component information storage unit 111. The replacement component specifying unit 122 transmits the data representing the specified component to the sales page generating unit 124 and the estimate calculating unit 126.

The tool specifying unit 123 specifies a tool needs to be prepared to dismount the component represented by the data received by the selected component data receiving unit 119 and the components specified by the dismounted component specifying unit 122. Specifically, the tool specifying unit 123 receives, from the selected component data receiving unit 119, the data representing one component selected by the field engineer among the plurality of components constituting one mechanism. The tool specifying unit 123 receives the data representing the components from the dismounted component specifying unit 121, and then, specifies a tool needs to be prepared to dismount the components represented by the data and the component represented by the data received by the selected component data receiving unit 119 using the information stored in the component information storage unit 111. The tool specifying unit 123 transmits data representing the specified tool to the sales page generating unit 124 and the estimate calculating unit 126.

The sales page generating unit 124 generates a web page for selling a plurality of components constituting the mechanism represented by the data received by the selected mechanism data receiving unit, to the field engineer. Specifically, the sales page generating unit 124 receive the data representing one mechanism selected by the field engineer from the selected mechanism data receiving unit 118, and then, generates a web page for selling a plurality of components constituting the mechanism represented by the data using the information stored in the component information storage unit 111 and data representing the drawings of mechanisms stored in the mechanism drawing data storage unit 114. The sales page generating unit 124 transmits data representing the generated web page to the web page transmitting unit 128.

Moreover, the sales page generating unit 124 generates a web page for selling the component represented by the data received by the selected component data receiving unit 119 and the component specified by the replacement component specifying unit 122, to the field engineer. Specifically, the sales page generating unit 124 receives the data representing one component selected by the field engineer among the plurality of components constituting one mechanism from the selected component data receiving unit 119. The sales page generating unit 124 receive the data representing the component from the replacement component specifying unit 122, and then, generates a web page for selling, to the field engineer, the component represented by the component and the component represented by the data received from the selected component data receiving unit 119 using the information stored in the component information storage unit 111 and the data representing the drawings of mechanisms stored in the mechanism drawing data storage unit 114. The sales page generating unit 124 transmits data representing the generated web page to the web page transmitting unit 128.

Moreover, when generating the web page, the sales page generating unit 124 generates a web page configured to allow the field engineer to understand that each of the component represented by the data received by the selected component data receiving unit 119 and the component specified by the replacement component specifying unit 122 corresponds to the component among the components constituting each mechanism.

Moreover, when generating the web page, the sales page generating unit 124 generates a web page for selling the tool specified by the tool specifying unit 123 besides the component to the field engineer. Specifically, the sales page generating unit 124 receives the data representing the tool from tool specifying unit 123, and then generates a web page for further selling the tool represented by the data using the information stored in the tool information storage unit 112.

The work flow page generating unit 125 generates a web page including digital contents showing the flow of a work at the maintenance type specified by the maintenance type specifying unit 120. Specifically, the work flow page generating unit 125 receives the data representing the maintenance type from the maintenance type specifying unit 120, and then, generates a web page including digital contents representing the flow of a work corresponding to the maintenance type represented by the data using the data representing the flow of works, stored in the work flow data storage unit 115. The work flow page generating unit 125 transmits data representing the generated web page to the web page transmitting unit 128.

The estimate calculating unit 126 calculates an estimate for the work of replacing these components using the price of the component represented by the data received by the selected component data receiving unit 119 and the price of the component specified by the replacement component specifying unit 122. Specifically, the estimate calculating unit 126 receives the data of one component selected by the field engineer among the plurality of components constituting one mechanism from the selected component data receiving unit 119. The estimate calculating unit 126 receives the data representing the component from the replacement component specifying unit 122, and then, specifies the price of the component represented by the data and the price of the component represented by the data received from the selected component data receiving unit 119 using the information stored in the component information storage unit 111. The estimate calculating unit 126 calculates the estimate for the work of replacing these components using the specified prices of these components. The estimate calculating unit 126 transmits data representing the calculated estimate to the estimate page generating unit 127.

Moreover, the estimate calculating unit 126 calculates the estimate further using the price of the tool specified by the tool specifying unit 123. Specifically, the estimate calculating unit 126 receives the data representing the tool from the tool specifying unit 123, the estimate calculating unit 126 specifies the price of the tool represented by the data using the information stored in the tool information storage unit 112. The estimate calculating unit 126 calculates the estimate further using the price of the specified tool.

Moreover, the estimate calculating unit 126 calculates the estimate further using working hours required for the maintenance, determined based on the maintenance type specified by the maintenance type specifying unit 120. Specifically, the estimate calculating unit 126 receives the data representing the maintenance type from the maintenance type specifying unit 120, and then specifies the working hours required for the maintenance, determined based on the maintenance type represented by the data using the information stored in the maintenance type information storage unit 113. The estimate calculating unit 126 calculates the estimate further using the specified work period.

The estimate page generating unit 127 generates a web page for presenting information on the estimate calculated by the estimate calculating unit 126 to the field engineer. Specifically, the estimate page generating unit 127 receives the data representing the estimate from the estimate calculating unit 126, and then generates a web page for presenting the information on the estimate represented by the data to the field engineer. The estimate page generating unit 127 transmits the data representing the generated web page to the web page transmitting unit 128.

The web page transmitting unit 128 transmits the web page generated by the mechanism selection page generating unit 117 to the client 130 which is a source of the data received by the access request data receiving unit 116. Specifically, the web page transmitting unit 128 receives data representing the client 130 from the access request data receiving unit 116. The web page transmitting unit 128 receives the data representing the web page from the mechanism selection page generating unit 117, and then, transmits the data to the client 130 represented by the data received from the access request data receiving unit 116.

Moreover, the web page transmitting unit 128 transmits the web page generated by the sales page generating unit 124 to the client 130 corresponding to the transmission source of the data received by the selected mechanism data receiving unit 118. Specifically, the web page transmitting unit 128 receives the data representing the client 130 from the selected mechanism data receiving unit 118. The web page transmitting unit 128 receives the data representing the web page from the sales page generating unit 124 and then transmits the data to the client 130 represented by the data received from the selected mechanism data receiving unit 118.

Moreover, the web page transmitting unit 128 transmits the web page generated by the sales page generating unit 124 to the client 130 which is a source of the data received by the selected component data receiving unit 119. Specifically, the web page transmitting unit 128 receives the data representing the client 130 to the selected component data receiving unit 119. The web page transmitting unit 128 receives the data representing the web page from the sales page generating unit 124, and then transmits the data to the client 130 represented by the data received from the selected component data receiving unit 119.

Moreover, the web page transmitting unit 128 transmits the web page generated by the work flow page generating unit 125 together to the client 130 which is a source of the data received by the selected component data receiving unit 119. Specifically, the web page transmitting unit 128 receives the data representing the web page from the work flow page generating unit 125, transmits the data together to the client 130 represented by the data received from the selected component data receiving unit 119.

Moreover, the web page transmitting unit 128 transmits the web page generated by the estimate page generating unit 127 together to the client 130 which is a source of the data received by the selected component data receiving unit 119. Specifically, the web page transmitting unit 128 receives the data representing the web page from the estimate page generating unit 127, transmits the data together to the client 130 represented by the data received from the selected component data receiving unit 119.

FIG. 3 shows an example of the information in a table format, stored in the component information storage unit 111 of the web server 110. The component information storage unit 111 stores a component identifier (ID), a component name, a mechanism ID, a drawing number, a maintenance type ID, the necessity of replacement, a tool ID, and a price (Yen) in a correlated manner.

The component ID may be an identification code for uniquely identifying respective components among a plurality of components that constitutes each of a plurality of mechanisms constituting a forklift. The component name may be a language-based symbol given as one corresponding to the component identified by the component ID in order to distinguish the component from other components. The mechanism ID may be an identification code for uniquely identifying a mechanism constituted by the component identified by the component ID among a plurality of mechanisms constituting the forklift. The drawing number may be a number representing a component identified by the component ID in a mechanism drawing. The maintenance type ID may be an identification code for uniquely identifying the type of maintenance for replacing the component identified by the component ID among a plurality of types of maintenance regarding the forklift. The necessity of replacement may be a language-based symbol representing whether the component identified by the component ID will be replaced or not, when the component is dismounted at the course of maintenance. The tool ID may be an identification code for uniquely identifying a tool needs to be prepared to dismount the component identified by the component ID among a plurality of tools used for maintenance of the forklift. The price (Yen) may be a numeric value expressed in currency, representing the value of the component identified by the component ID.

FIG. 4 shows an example of the information in a table format, stored in the tool information storage unit 112 of the web server 110. The tool information storage unit 112 stores a tool ID, a tool name, and a price (Yen) in a correlated manner.

The tool ID may be an identification code for uniquely identifying respective tools among a plurality of tools used for maintenance of the forklift. The tool name may be a language-based symbol given as one corresponding to the tool identified by the tool ID in order to distinguish the tool from other tools. The price (Yen) may be a numeric value expressed in currency, representing the value of the tool identified by the tool ID.

FIG. 5 shows an example of the information in a table format, stored in the maintenance type information storage unit 113 of the web server 110. The maintenance type information storage unit 113 stores a maintenance type ID, a maintenance type name, a dismounted order, and working hours (h) in a correlated manner.

The maintenance type ID may be an identification code for uniquely identifying the respective types of maintenance among a plurality of types of maintenance regarding the forklift. The maintenance type name may be a language-based symbol given as one corresponding to the type of maintenance identified by the maintenance type ID in order to distinguish the maintenance type from other maintenance types. The dismounted order may be information representing the order of dismounting components corresponding to the maintenance type identified by the maintenance type ID. The working hours (h) may be a numeric value representing working hours required for the maintenance, determined based on the maintenance type identified by the maintenance type ID.

Figure 6:
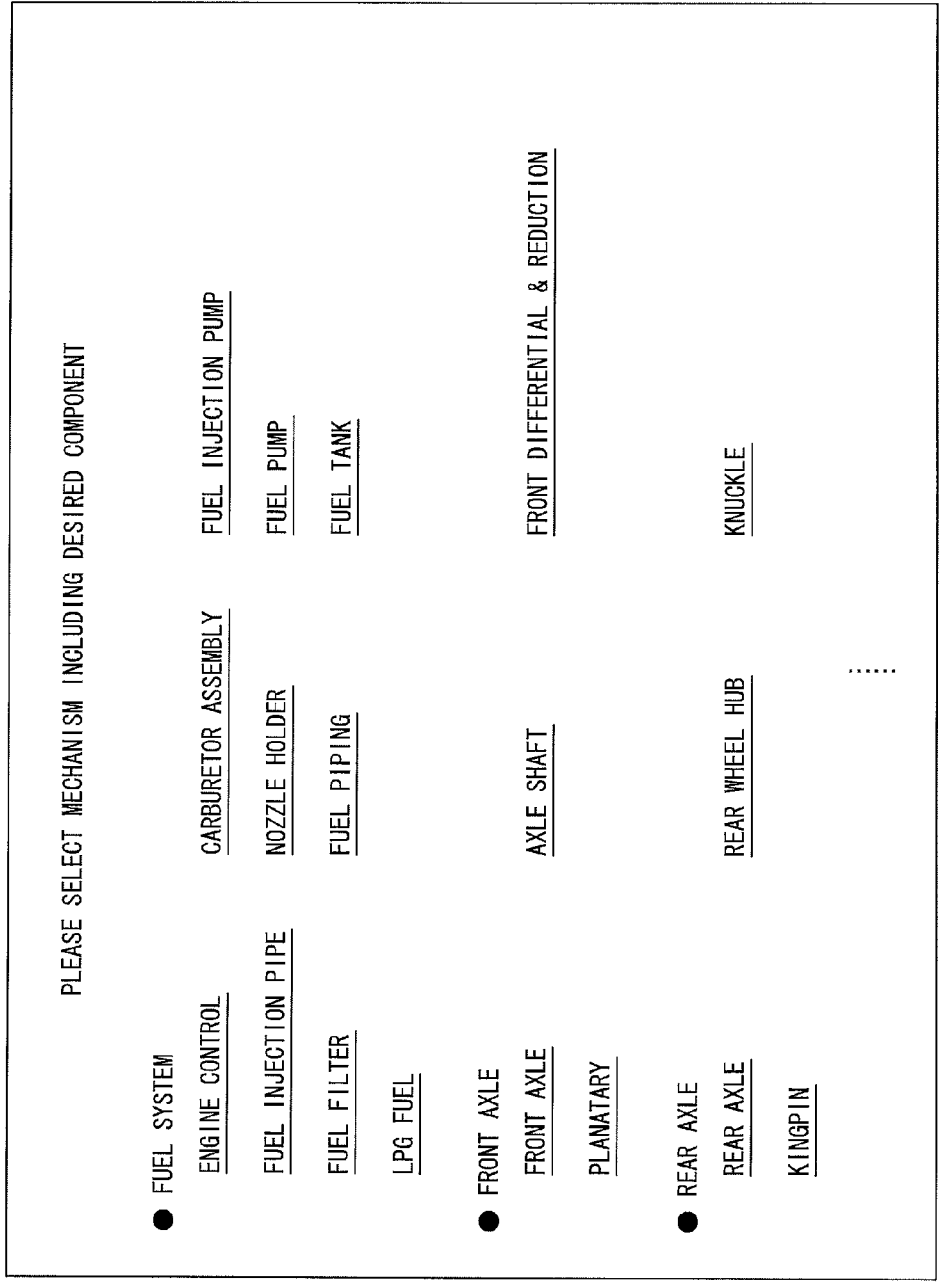
FIG. 6 is a diagram showing an example of a web page generated by a mechanism selection page generating unit 117 of the web server 110.

FIG. 6 shows an example of a web page generated by the mechanism selection page generating unit 117 of the web server 110. Specifically, in the web page shown in FIG. 6, a plurality of hyperlinks that links the texts of the names of a plurality of mechanisms constituting the forklift to web pages for selling a plurality of components constituting the mechanism so as to allow a user to guide to a web page of the link's destination when the link is selected is displayed.

Figure 7:
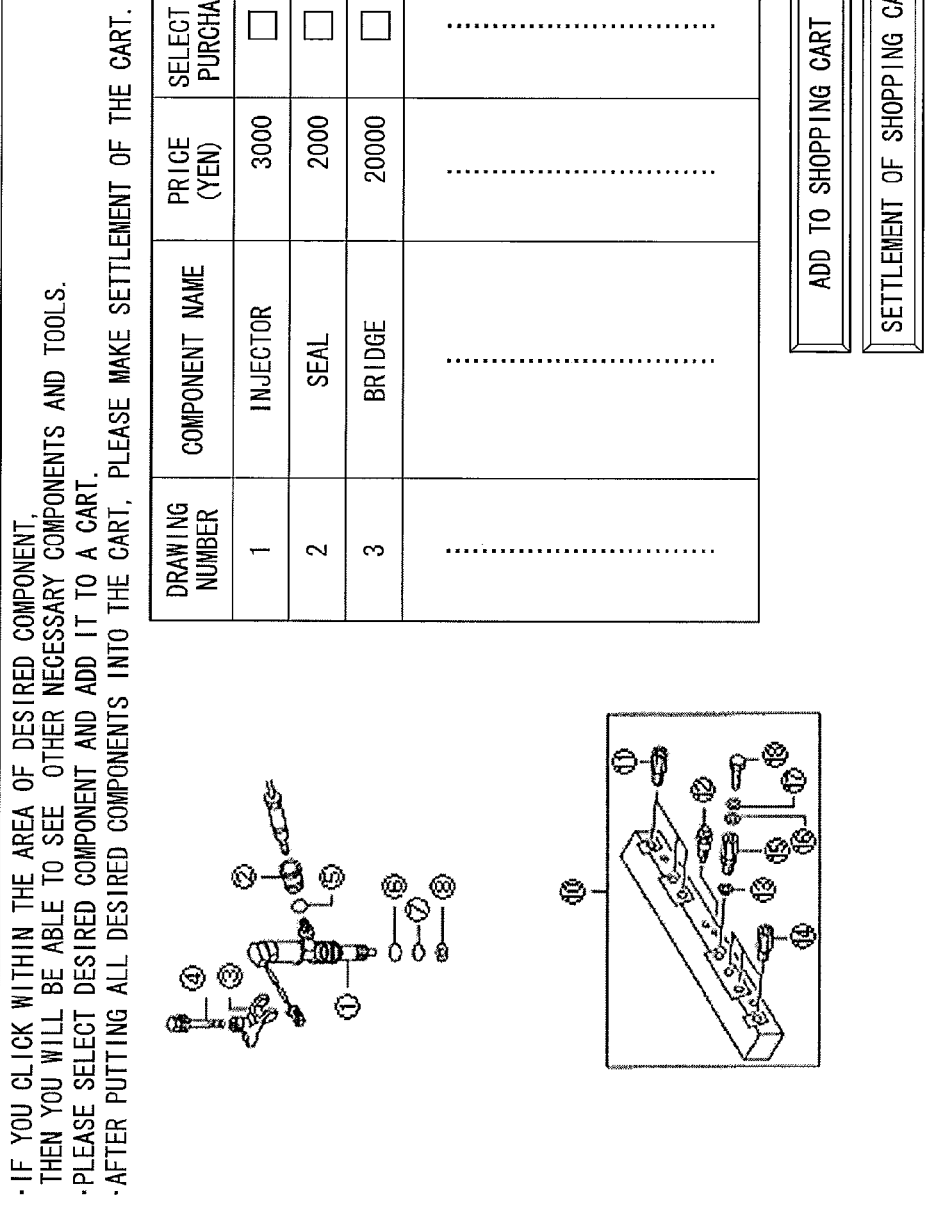
FIG. 7 is a diagram showing an example of a web page generated by a sales page generating unit 124 of the web server 110.

FIG. 7 shows an example of a web page generated by the sales page generating unit 124 of the web server 110. Specifically, in the web page shown in FIG. 7, the drawing of a selected mechanism and a list of information on a plurality of components constituting the selected mechanism are displayed. Moreover, in this web page, a checkbox for allowing the field engineer to select a desired component is displayed to the right of the information of the respective components. Furthermore, in this web page, a button for storing components of which the checkboxes are checked in a shopping cart is displayed. Furthermore, in this web page, a button for settlement the components stored in the shopping cart is displayed.

FIG. 8 shows another example of a web page generated by the sales page generating unit 124 of the web server 110. Specifically, in the web page shown in FIG. 8, the information on a component selected by clicking in the web page shown in FIG. 7 and the number in the drawing of the corresponding component are displayed in a highlighted manner.

Figure 9:
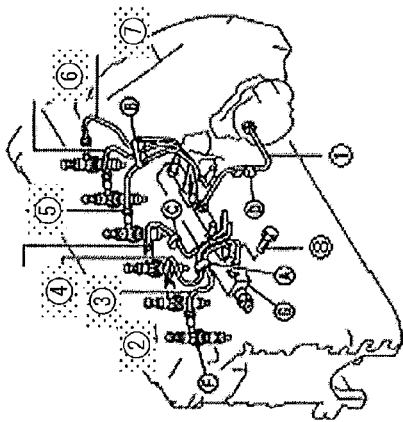
FIG. 9 is a diagram showing a further example of the web page generated by the sales page generating unit 124 of the web server 110.

FIG. 9 shows a further example of a web page generated by the sales page generating unit 124 of the web server 110. Specifically, in the web page shown in FIG. 9, the information on a component to be replaced when replacing a selected component, and the number in the drawing of the corresponding component are displayed in a highlighted manner. However, in this example, the web page shown in FIG. 9 is generated as a web page different from the web page for selling the selected component because a mechanism constituted by the component to be replaced when replacing a selected component is different from the mechanism constituted by the selected component.

FIG. 10 shows a still further example of a web page generated by the sales page generating unit 124 of the web server 110. Specifically, the web page shown in FIG. 10 is a web page for selling a tool needs to be prepared to dismount the selected component and the component to be replaced when replacing a selected component. In this web page, the information of tools needs to be prepared is displayed as a list.

Figure 11:
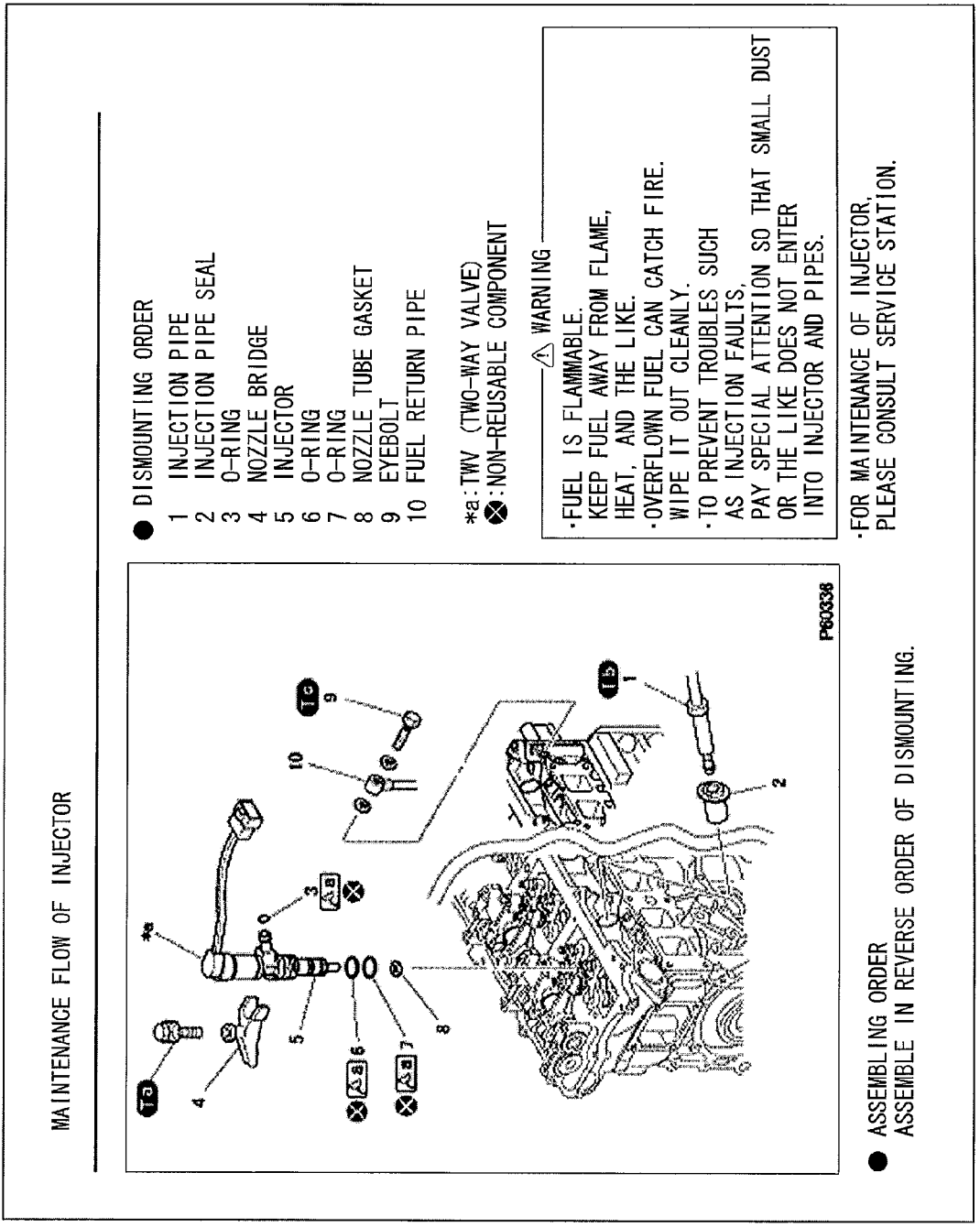
FIG. 11 is a diagram showing an example of a web page generated by a work flow page generating unit 125 of the web server 110.

FIG. 11 shows an example of a web page generated by the work flow page generating unit 125 of the web server 110. Specifically, in the web page shown in FIG. 11, the order of replacing the selected component is shown by digital contents of a maintenance manual drawing.

FIG. 12 shows an example of a web page generated by the estimate page generating unit 127 of the web server 110. Specifically, in the web page shown in FIG. 12, detailed information on the estimate calculated using the price of a target component selected by the field engineer, the price of the component to be replaced together with the component, the price of the tool needs to be prepared to replace these components, and the working hours for the maintenance for replacing these components is displayed.

Figure 13:
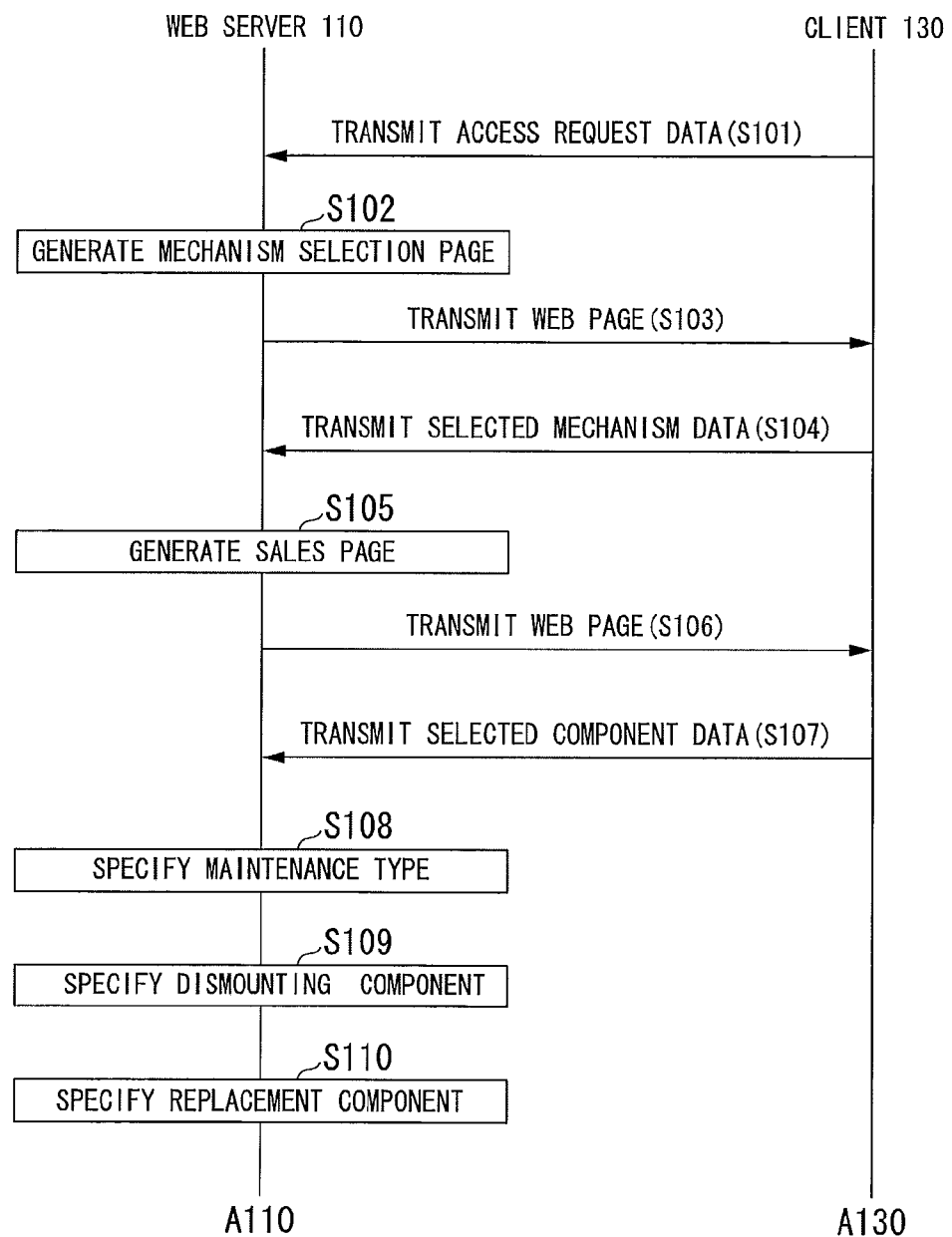
FIG. 13 is a diagram showing an example of an operation sequence of the web server 110 and a client 130.
Figure 14:
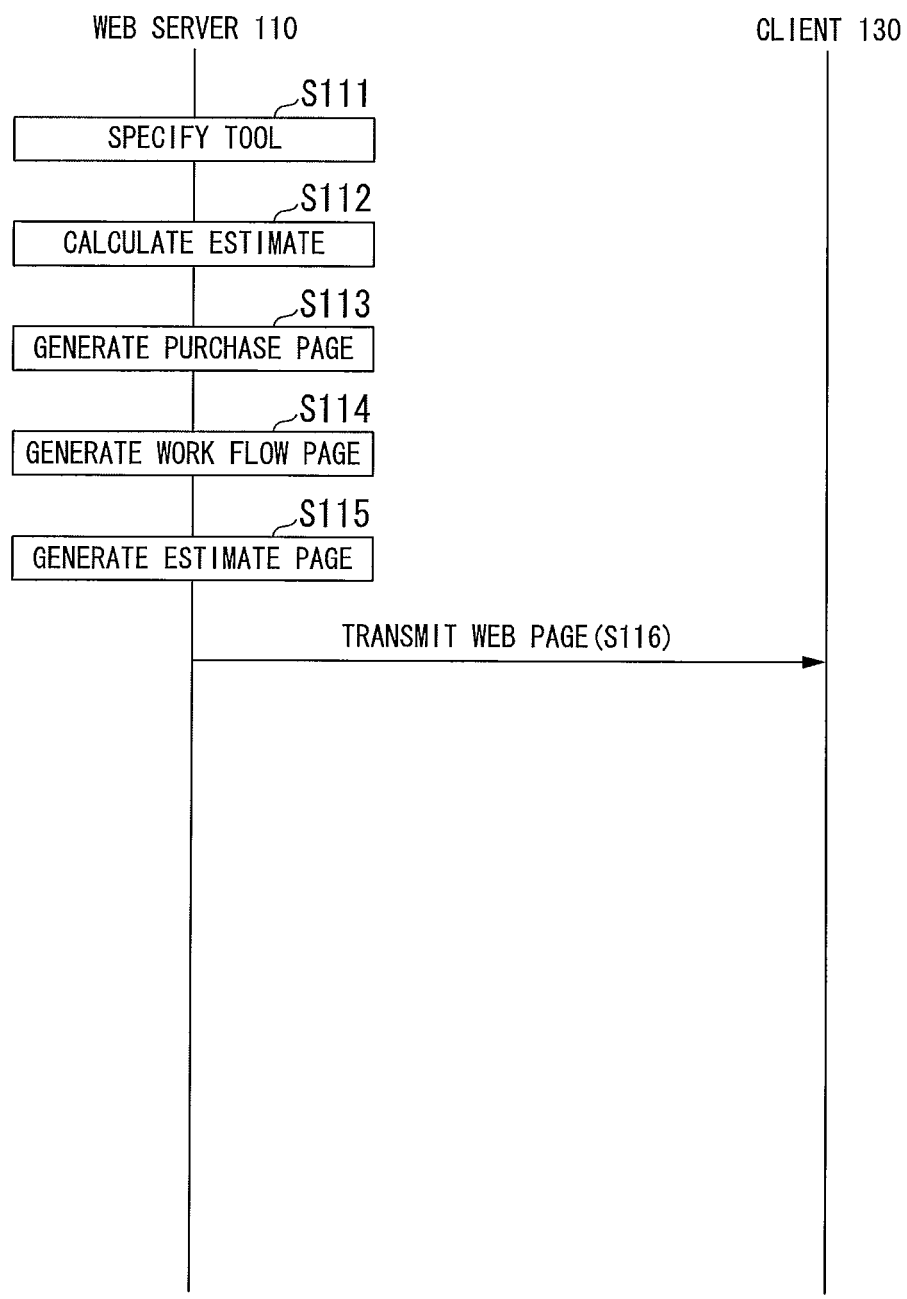
FIG. 14 is a diagram showing an example of an operation sequence of the web server 110 and the client 130.

FIGS. 13 and 14 show an example of an operation sequence of the web server 110 and the client 130. The operation sequence of the web server 110 and the client 130 will be described with reference to FIGS. 1 to 12.

When the client 130 receives the input of data representing an access request to an electronic store, the client 130 transmits the data to the web server 110 (S101). For example, when the uniform resource locator (URL) of the electronic store is input to a web browser, the client 130 transmits data representing an access request of the electronic store to the web server 110 providing the electronic store represented by the URL. The access request data receiving unit 116 of the web server 110 transmits data representing the notice to the mechanism selection page generating unit 117, when the access request data receiving unit 116 receives the data representing the access request to the electronic store, from the client 130. Moreover, the access request data receiving unit 116 transmits data representing the client 130 corresponding to a transmission source of the received data to the web page transmitting unit 128. For example, the access request data receiving unit 116 transmits an Internet protocol (IP) address of the client 130 corresponding to the transmission source of the received data to the web page transmitting unit 128.

The mechanism selection page generating unit 117 of the web server 110 generates a web page for allowing a field engineer to select one mechanism among a plurality of mechanisms constituting a forklift, when the mechanism selection page generating unit 117 receives the data representing the notice of the access request to the electronic store, from the access request data receiving unit 116 (S102). The mechanism selection page generating unit 117 transmits data representing the generated web page to the web page transmitting unit 128. For example, the mechanism selection page generating unit 117 generates a web page as shown in FIG. 6.

The web page transmitting unit 128 of the web server 110 receives the data representing the client 130 from the access request data receiving unit 116. The web page transmitting unit 128 transmits the data to the client 130 represented by the data received from the access request data receiving unit 116 when the web page transmitting unit 128 receives the data representing the web page from the mechanism selection page generating unit 117 from the web page transmitting unit 128 (S103). For example, the web page transmitting unit 128 receives the IP address of the client 130 from the access request data receiving unit 116. When the web page transmitting unit 128 receives the data representing the web page as shown in FIG. 6, from the mechanism selection page generating unit 117, the web page transmitting unit 128 transmits the data to the IP address received from the access request data receiving unit 116.

In this way, on the display of the client 130, the web page as shown in FIG. 6 is displayed by a web browser. When the client 130 receives the input of the data representing one mechanism selected by the field engineer among the plurality of mechanisms constituting the forklift, the client 130 transmits the data to the web server 110 (S104). For example, in the web page shown in FIG. 6, when a hyperlink represented by the text of "fuel injection pipe" (a mechanism identified by a mechanism ID "ME001") is selected, the client 130 transmits data representing the mechanism ID "ME001" of the selected mechanism "fuel injection pipe" to the web server 110. When the selected mechanism data receiving unit 118 receives the data representing one mechanism selected by the field engineer among the plurality of mechanisms constituting the forklift, from the client 130, the selected mechanism data receiving unit 118 of the web server 110 transmits the data to the sales page generating unit 124. Moreover, the selected mechanism data receiving unit 118 transmits the data representing the client 130 corresponding to the transmission source of the received data to the web page transmitting unit 128. For example, when the selected mechanism data receiving unit 118 receives the data representing the mechanism ID "ME001" from the client 130, the selected mechanism data receiving unit 118 transmits the data to the sales page generating unit 124. Moreover, the selected mechanism data receiving unit 118 transmits the IP address of the client 130 corresponding to the transmission source of the received data to the web page transmitting unit 128.

When the sales page generating unit 124 of the web server 110 receives the data representing one mechanism selected by the field engineer from the selected mechanism data receiving unit 118, the sales page generating unit 124 generates a web page for selling a plurality of components constituting the mechanism represented by the data to the field engineer using the information stored in the component information storage unit 111 and the data representing the drawing of the mechanism, stored in the mechanism drawing data storage unit 114 (S105). The sales page generating unit 124 transmits the data representing the generated web page to the web page transmitting unit 128. For example, when the sales page generating unit 124 receives the data representing the mechanism ID "ME001" from the selected mechanism data receiving unit 118, the sales page generating unit 124 reads respective information on a component name, a drawing number, and a price (Yen) of the component correlated with the mechanism ID "ME001" within the information stored in the component information storage unit 111. Moreover, the sales page generating unit 124 reads data representing the drawing of the mechanism of the mechanism ID "ME001" among the data stored in the mechanism drawing data storage unit 114. The sales page generating unit 124 generates a web page as shown in FIG. 7 using the respective information read from the component information storage unit 111 and the data read from the mechanism drawing data storage unit 114.

The web page transmitting unit 128 of the web server 110 receives the data representing the client 130 from the selected mechanism data receiving unit 118. When the web page transmitting unit 128 receives the data representing the web page from the sales page generating unit 124, the web page transmitting unit 128 transmits the data to the client 130 represented by the data received from the selected mechanism data receiving unit 118 (S106). For example, the web page transmitting unit 128 receives the IP address of the client 130 from the selected mechanism data receiving unit 118. When the web page transmitting unit 128 receives the data representing the web page as shown in FIG. 7 from the sales page generating unit 124, the web page transmitting unit 128 transmits the data to the IP address received from the selected mechanism data receiving unit 118.

In this way, on the display of the client 130, the web page as shown in FIG. 7 is displayed by a web browser. When the client 130 receives the input of the data representing one component selected by the field engineer among the plurality of components constituting one mechanism, the client 130 transmits the data to the web server 110 (S107). For example, in the web page shown in FIG. 7, when a component name "injector" (a component identified by a component ID "P001") is selected, the client 130 transmits the data representing the component ID "P001" of the selected component "injector" to the web server 110. When the selected component data receiving unit 119 of the web server 110 receives, from the client 130, the data representing one component selected by the field engineer among the plurality of components constituting one mechanism, the selected component data receiving unit 119 transmits the data to the maintenance type specifying unit 120, the dismounted component specifying unit 121, the tool specifying unit 123, the sales page generating unit 124, and the estimate calculating unit 126. Moreover, the selected component data receiving unit 119 transmits the data representing the client 130 which is the transmission source of the received data to the web page transmitting unit 128. For example, when the selected component data receiving unit 119 receives the data representing the component ID "P001" from the client 130, the selected component data receiving unit 119 transmits the data to the maintenance type specifying unit 120, the dismounted component specifying unit 121, the tool specifying unit 123, the sales page generating unit 124, and the estimate calculating unit 126. Moreover, the selected component data receiving unit 119 transmits the IP address of the client 130 which is the transmission source of the received data to the web page transmitting unit 128.

When the maintenance type specifying unit 120 of the web server 110 receives the data representing one component selected by the field engineer among the plurality of components constituting one mechanism, from the selected component data receiving unit 119, the maintenance type specifying unit 120 specifies the type of maintenance for replacing the component represented by the data using the information stored in the component information storage unit 111 (S108). The maintenance type specifying unit 120 transmits the data representing the specified maintenance type to the dismounted component specifying unit 121, the work flow page generating unit 125, and the estimate calculating unit 126. For example, the maintenance type specifying unit 120 reads a maintenance type ID "MA001" correlated with the component ID "P001" within the information stored in the component information storage unit 111 when the maintenance type specifying unit 120 receives the data representing a component ID "P001" from the selected component data receiving unit 119. And then, the maintenance type specifying unit 120 transmits the read data representing the maintenance type ID "MA001" to the dismounted component specifying unit 121, the work flow page generating unit 125, and the estimate calculating unit 126.

The dismounted component specifying unit 121 of the web server 110 receives the data representing one mechanism selected by the field engineer among the plurality of components constituting one mechanism from the selected component data receiving unit 119. When the dismounted component specifying unit 121 receives the data representing the maintenance type from the maintenance type specifying unit 120, the dismounted component specifying unit 121 specifies other components dismounted with the selected component at the scope of the work for replacing the component represented by the data received from the selected component data receiving unit 119 among the works included in the maintenance type represented by the data using the information stored in the maintenance type information storage unit 113 (S109). And then, the dismounted component specifying unit 121 transmits the data representing the specified component to the tool specifying unit 123 and the replacement component specifying unit 122. For example, the dismounted component specifying unit 121 receives the data representing the component ID "P001" from the selected component data receiving unit 119. The dismounted component specifying unit 121 reads information on the dismounting order correlated with the maintenance type ID "MA001" within the information stored in the maintenance type information storage unit 113, when the dismounted component specifying unit 121 receives the data representing the maintenance type ID "MA001" from the maintenance type specifying unit 120. The dismounted component specifying unit 121 reads component IDs "P002," "P003," "P004," and "P005" of the other components dismounted together with the component ID "P001" among the components included in the read dismounting order. And then, the dismounted component specifying unit 121 transmits data representing the read component IDs "P002," "P003," "P004," and "P005" to the tool specifying unit 123 and the replacement component specifying unit 122.

When the replacement component specifying unit 122 of the web server 110 receives the data representing the components from the dismounted component specifying unit 121, the replacement component specifying unit 122 specifies a component to be replaced concurrently among the components represented by the data using the information stored in the component information storage unit 111 (S110). The replacement component specifying unit 122 transmits data representing the specified component to the sales page generating unit 124 and the estimate calculating unit 126. For example, the replacement component specifying unit 122 reads information on the necessity of replacement correlated with each of the component IDs "P002," "P003," "P004," and "P005" within the information stored in the component information storage unit 111, when the replacement component specifying unit 122 receives the data representing the component IDs "P002," "P003," "P004," and "P005" from the dismounted component specifying unit 121. In this example, the replacement component specifying unit 122 transmits data representing the component ID "P002" of which the information on the necessity of replacement is "Yes" to the sales page generating unit 124 and the estimate calculating unit 126.

The tool specifying unit 123 of the web server 110 receives the data representing one component selected by the field engineer among the plurality of components constituting one mechanism from the selected component data receiving unit 119. When the tool specifying unit 123 receives the data representing the components from the dismounted component specifying unit 121, the tool specifying unit 123 specifies a tool to be prepared to dismount the components represented by the data and the component represented by the data received from the selected component data receiving unit 119 using the information stored in the component information storage unit 111 (S111). The tool specifying unit 123 transmits data representing the specified tool to the sales page generating unit 124 and the estimate calculating unit 126. For example, the tool specifying unit 123 receives data representing the component ID "P001" from the selected component data receiving unit 119. And then, the tool specifying unit 123 reads information on a tool ID correlated with each of the component IDs "P001" and "P002" within the information stored in the component information storage unit 111, when the tool specifying unit 123 receives the data representing the component ID "P002" from the dismounted component specifying unit 121. In this example, the tool specifying unit 123 reads tool IDs "T001" and "T002" correlated with the component ID "P001." The tool specifying unit 123 transmits data representing the tool IDs "T001" and "T002" to the sales page generating unit 124 and the estimate calculating unit 126.

The estimate calculating unit 126 of the web server receives the data representing one component selected by the customer among the plurality of components constituting one mechanism from the selected component data receiving unit 119. Moreover, the estimate calculating unit 126 receives the data representing components from the replacement component specifying unit 122. Furthermore, the estimate calculating unit 126 receives the data representing tools from the tool specifying unit 123. Furthermore, the estimate calculating unit 126 receives the data representing a maintenance type from the maintenance type specifying unit 120. The estimate calculating unit 126 specifies the price of the component represented by the data received from the selected component data receiving unit 119 and the price of the component represented by the data received from the replacement component specifying unit 122 using the information stored in the component information storage unit 111. Moreover, the estimate calculating unit 126 specifies the price of the tool specified by the data received from the tool specifying unit 123 using the information stored in the tool information storage unit 112. Furthermore, the estimate calculating unit 126 specifies working hours required for the maintenance, determined based on the maintenance type represented by the data received from the maintenance type specifying unit 120 using the information stored in the maintenance type information storage unit 113. The estimate calculating unit 126 calculates the estimate for the work of replacing these components using the specified information (S112). The estimate calculating unit 126 transmits data representing the calculated estimate to the estimate page generating unit 127. For example, the estimate calculating unit 126 receives the data representing the component ID "P001" from the selected component data receiving unit 119. Moreover, the estimate calculating unit 126 receives the data representing the component ID "P002" from the replacement component specifying unit 122. Furthermore, the estimate calculating unit 126 receives the data representing the tool IDs "T001" and "T002" from the tool specifying unit 123. Furthermore, the estimate calculating unit 126 receives the data representing the maintenance type ID "MA001" from the maintenance type specifying unit 120. And then, the estimate calculating unit 126 reads a component name "injector," the number of drawing numbers "1," and a price "3000 (Yen)" correlated with the component ID "P001", and a component name "injection pipe," the number of drawing numbers "6," and a price "5000 (Yen)" correlated with the component ID "P002" within the information stored in the component information storage unit 111. Moreover, the estimate calculating unit 126 reads a tool name "injector-extractor adapter" and a price "9000 (Yen)" correlated with the tool ID "T001" and a tool name "nozzle extractor" and a price "9000 (Yen)" correlated with the tool ID "T002" within the information stored in the tool information storage unit 112. Furthermore, the estimate calculating unit 126 reads working hours "6.5 (h)" correlated with the maintenance type ID "MA001" within the information stored in the maintenance type information storage unit 113. The estimate calculating unit 126 calculates the estimate for the work for replacing these components using the information in a manner of 121800 (Yen)=(3000 (price of component P001)×1 (number of component P001)+5000 (price of component P002)×6 (number of component P002)+9000 (price of T001)+9000 (price of T002)+6.5 (working hours for MA001)×10000 (price per hour))×1.05 (including consumption tax).

The sales page generating unit 124 of the web server 110 receives the data representing one component selected by the customer among the plurality of components constituting one mechanism from the selected component data receiving unit 119. Moreover, the sales page generating unit 124 receives the data representing components from the replacement component specifying unit 122. Furthermore, the sales page generating unit 124 receives the data representing tools from the tool specifying unit 123. The sales page generating unit 124 generates a web page for selling, to the field engineer, the component represented by the data received from the selected component data receiving unit 119, the component represented by the data received from the replacement component specifying unit 122, the tool represented by the data received from the tool specifying unit 123 using the information stored in the component information storage unit 111, the information stored in the tool information storage unit 112, and the data representing the drawings of tools, stored in the mechanism drawing data storage unit 114 (S113). When generating the web page, the sales page generating unit 124 generates a web page configured to allow the field engineer to understand that each of the component represented by the data received by the selected component data receiving unit 119 and the component specified by the replacement component specifying unit 122 corresponds to the component of the components constituting each mechanism. The sales page generating unit 124 transmits the data representing the generated web page to the web page transmitting unit 128. For example, the sales page generating unit 124 receives the data representing the component ID "P001" from the selected component data receiving unit 119. Moreover, the sales page generating unit 124 receives the data representing the component ID "P002" from the replacement component specifying unit 122. Furthermore, the sales page generating unit 124 receives the data representing the tool IDs "T001" and "T002" from the tool specifying unit 123. The sales page generating unit 124 reads the mechanism ID "ME001" correlated with the component ID "P001" and the mechanism ID "ME002" correlated with the component ID "P002" within the information stored in the component information storage unit 111. And then, the sales page generating unit 124 reads a component name, a drawing number, and a price (Yen) of all components correlated with the mechanism IDs "ME001", and a component name, a drawing number, and a price (Yen) of all components correlated with the mechanism IDs "ME002" within the information stored in the component information storage unit 111. Moreover, the sales page generating unit 124 reads a tool name "injector-extractor adapter" and a price "9000 (Yen)" correlated with the tool ID "T001" and a tool name "nozzle extractor" and a price "9000 (Yen)" correlated with the tool ID "T002" within the information stored in the tool information storage unit 112. Furthermore, the sales page generating unit 124 reads the data representing the drawings of mechanisms of the mechanism IDs "ME001" and the data representing the drawings of mechanisms of the mechanism IDs "ME002" read from the component information storage unit 111 from the data stored in the mechanism drawing data storage unit 114. The sales page generating unit 124 generates a web page as shown in FIG. 8 using the respective information on the components correlated with the mechanism ID "ME0001" read from the component information storage unit 111 and the data representing the drawing of the mechanism of the mechanism ID "ME001" read from the mechanism drawing data storage unit 114. In this case, the sales page generating unit 124 displays the portions representing the respective information on the component of the component ID "P001" and the drawing number "1" of the component ID "P001" in the drawing so as to be highlighted within the list of components displayed in the web page. Moreover, the sales page generating unit 124 generates a web page as shown in FIG. 9 using the respective information on the components correlated with the mechanism ID "ME0002" read from the component information storage unit 111 and the data representing the drawing of the mechanism of the mechanism ID "ME002" read from the mechanism drawing data storage unit 114. In this case, the sales page generating unit 124 displays the portions representing the respective information on the component of the component ID "P002" and the drawing numbers "2," "2," "4," "5," "6," and "7" of the component ID "P002" in the drawing so as to be highlighted within the list of components displayed in the web page. Moreover, the sales page generating unit 124 generates a web page as shown in FIG. 10 using the respective information on the respective tools of the tool IDs "T001" and "T002" read from the tool information storage unit 112.

When the work flow page generating unit 125 of the web server 110 receives the data representing the maintenance type from the maintenance type specifying unit 120, the work flow page generating unit 125 generates a web page including digital contents representing the work flow corresponding to the maintenance type represented by the data using the data representing the work flow stored in the work flow data storage unit 115 (S114). The work flow page generating unit 125 transmits the data representing the generated web page to the web page transmitting unit 128. For example, when the work flow page generating unit 125 receives the data representing the maintenance type ID "MA001" from the maintenance type specifying unit 120, the work flow page generating unit 125 reads data representing the work flow of the maintenance type ID "MA001" among the data stored in the work flow data storage unit 115. And then, the work flow page generating unit 125 generates a web page as shown in FIG. 11 using the data read from the work flow data storage unit 115.

The estimate page generating unit 127 of the web server 110 generates a web page for presenting the information on the estimate represented by the data to the field engineer, when the estimate page generating unit 127 receives the data representing the estimate from the estimate calculating unit 126 (S115). And then, the estimate page generating unit 127 transmits the data representing the generated web page to the web page transmitting unit 128. For example, the estimate page generating unit 127 generates a web page as shown in FIG. 12, when the estimate page generating unit 127 receives the data representing the estimate from the estimate calculating unit 126.

The web page transmitting unit 128 of the web server 110 receives the data representing the client 130 from the selected component data receiving unit 119. When the web page transmitting unit 128 receives the data representing the web page from the sales page generating unit 124, the work flow page generating unit 125, and the estimate page generating unit 127, the web page transmitting unit 128 transmits these data to the client 130 represented by the data received from the selected component data receiving unit 119 (S116). For example, the web page transmitting unit 128 receives the IP address of the client 130 from the selected component data receiving unit 119. Moreover, the web page transmitting unit 128 receives the web page as shown in FIGS. 8 to 10 from the sales page generating unit 124, the web page as shown in FIG. 11 from the work flow page generating unit 125, and the web page as shown in FIG. 12 from the estimate page generating unit 127. The web page transmitting unit 128 transmits these web pages to the IP address received from the selected component data receiving unit 119.

In this way, on the display of the client 130, the web pages as shown in FIGS. 8 to 12 are displayed by a web browser.

As described above, in the component sales system 100, a web page as shown in FIG. 8 or 9 is displayed on the display of the client 130, so that a desired component selected by the field engineer and a component to be replaced when performing an operation of replacing the desired component can be purchased together. As a result, the field engineer can proceed a purchasing operation while checking respective necessary components at the same time without taking time and effort of separately finding and purchasing the component to be replaced together with the desired component. Moreover, the field engineer can understand the presence of the component to be replaced together even if the field engineer is not aware of or forgets about the presence of the component to be replaced concurrently with the desired component.

Moreover, in the component sales system 100, when the desired component and the component to be replaced with the desired component are components that constitute the same mechanism, a web page is displayed so that it can be understood which component among a plurality of components constituting the same mechanism, each of the desired component and the component to be replaced with the desired component corresponds to is displayed on the display of the client 130, for example, in which the information representing the respective components is highlighted in different colors. Moreover, when the desired component and the component to be replaced with the desired component are components constituting different mechanisms, a web page is displayed as shown in FIG. 8 and a web page as shown in FIG. 9 on the display of the client 130, for example. The web page as shown in FIG. 8 in which the information of the desired component is highlighted in color, for example, so that it can be understood which component among a plurality of components constituting one mechanism, the desired component corresponds to. The a web page as shown in FIG. 9, for example, in which the information of the component to be replaced together is highlighted in color, for example, so that it can be understood which component among a plurality of components constituting the other mechanism, the component to be replaced with desired component corresponds to is displayed on the display of the client 130. In this way, the field engineer can understand at a glance which component among a plurality of components, each of the desired component and the component to be replaced together corresponds to.

Moreover, in the component sales system 100, a web page as shown in FIG. 10 is displayed on the display of the client 130, so that a tool necessary for replacing the desired component and the other components dismounted concurrently with the desired component can be purchased. As a result, the field engineer can purchase the tool without fail when the field engineer does not possess a tool necessary for replacing the desired component and the other components dismounted concurrently with the desired component.

Moreover, in the component sales system 100, a web page as shown in FIG. 11, including the digital contents such as a slideshow, a movie, or a maintenance manual drawing, showing the work flow of replacing the desired component is displayed on the display of the client 130. As a result, the field engineer can understand the detailed flow of replacing the desired component and the component to be replaced with the desired component while watching the digital contents such as a slideshow, a movie, or a maintenance manual drawing.

Moreover, in the component sales system 100, a web page as shown in FIG. 12, presenting the estimate for a case of purchasing the desired component and the component to be replaced with the desired component is displayed on the display of the client 130. As a result, the field engineer can obtain an estimate to which the price of the desired component and the price of the component to be replaced with the desired component are applied without the needs to calculate the estimate for the maintenance work manually.

Moreover, in the component sales system 100, a web page as shown in FIG. 12, presenting an estimate for a case of further purchasing a tool to be prepared to dismount the desired component and the component to be replaced concurrently is displayed on the display of the client 130. As a result, the field engineer can obtain an estimate to which the price of the desired component and the price of the tool needs to be prepared to dismount the component to be replaced concurrently without the needs to calculate the estimate for the maintenance work manually.

Moreover, in the component sales system 100, a web page as shown in FIG. 12, for presenting a detailed estimate for the work of replacing the desired component is displayed on the display of the client 130. As a result, the field engineer can obtain a detailed estimate to which the working hours required for the maintenance is also applied without the needs to calculate the estimate for the maintenance work manually.

Figure 15:
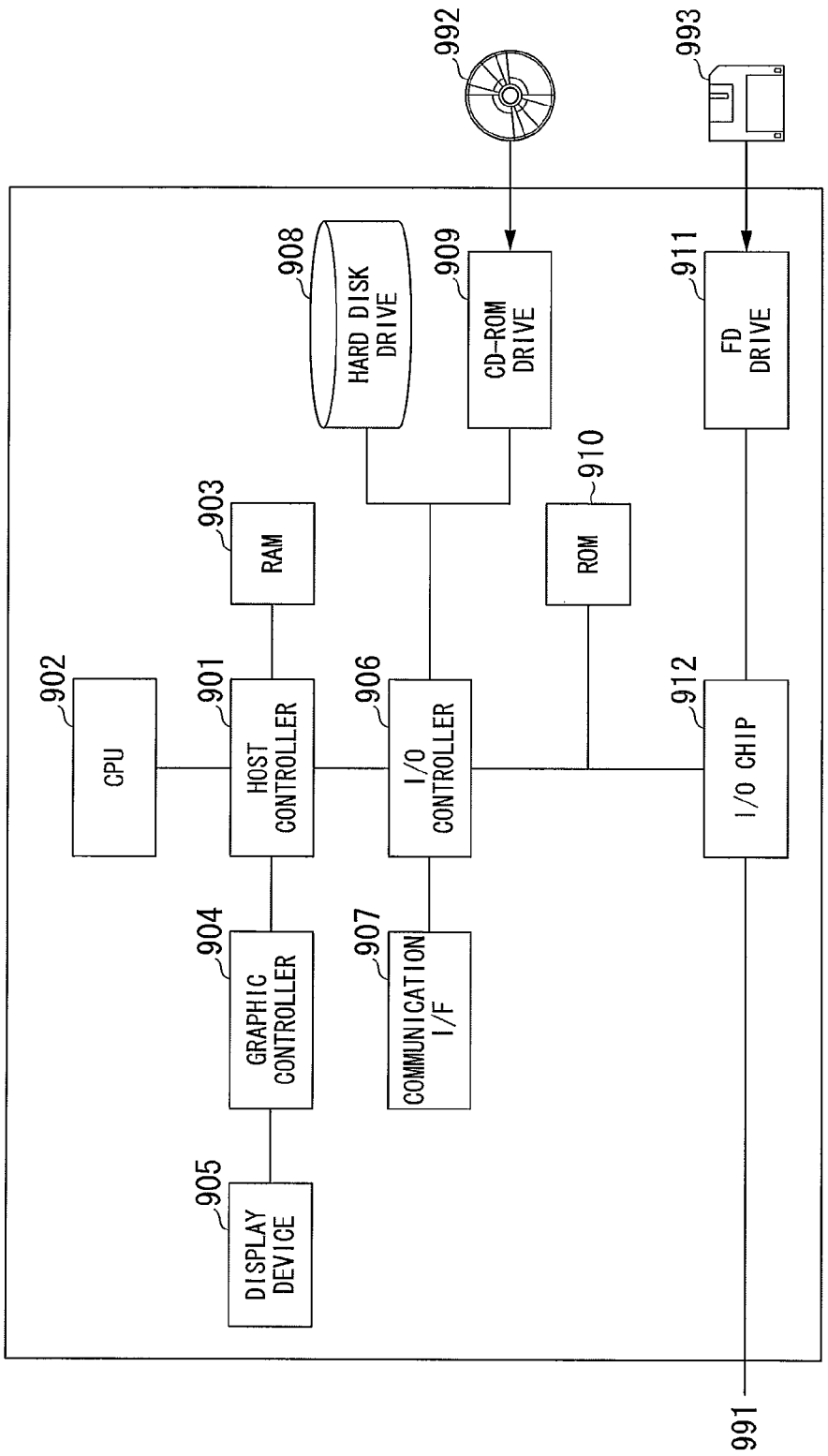
FIG. 15 is a diagram showing an example of a hardware configuration of the web server 110.

FIG. 15 shows an example of a hardware configuration when the web server 110 is configured as an electronic information processing device such as a computer. The web server 110 includes a central processing unit (CPU) peripheral device, an input/output unit, and a legacy input/output unit. The CPU peripheral device includes a CPU 902, a random access memory (RAM) 903, a graphic controller 904, and a display device 905 which are connected to each other by a host controller 901. The input/output unit includes a communication interface 907, a hard disk drive 908, and a compact disk read only memory (CD-ROM) drive 909 which are connected to the host controller 901 by an input/output controller 906. The legacy input/output unit includes a read only memory (ROM) 910, a flexible disk drive 911, and an input/output chip 912 which are connected to the input/output controller 906.

The host controller 901 connects the RAM 903 to the CPU 902 accessing the RAM 903 at a high data rate and to the graphic controller 904. The CPU 902 operates based on programs stored in the ROM 910 and the RAM 903 so as to control respective units. The graphic controller 904 acquires image data which the CPU 902 or the like generates on a frame buffer provided in the RAM 903 and displays the image data on the display device 905. Alternatively, the graphic controller 904 may include a frame buffer for storing the image data generated by the CPU 902 or the like.

The input/output controller 906 connects the host controller 901 to the hard disk drive 908, the communication interface 907, and the CD-ROM drive 909 which are relatively high-speed input/output devices. The hard disk drive 908 stores programs and data used by the CPU 902. The communication interface 907 connects to a network communication device 991 to thereby transmit and receive programs or data. The CD-ROM drive 909 reads programs or data from a CD-ROM 992 and provides the same to the hard disk drive 908 and the communication interface 907 through the RAM 903.

The input/output controller 906 is connected to the ROM 910, and relatively low-speed input/output devices of the flexible disk drive 911 and the input/output chip 912. The ROM 910 stores a boot program executed when starting the web server 110, programs dependent on the hardware of the web server 110, or the like. The flexible disk drive 911 reads programs or data from the flexible disk 993 and provides the same to the hard disk drive 908 and the communication interface 907 through the RAM 903. The input/output chip 912 connects the flexible disk drive 911 or various input/output devices through a parallel port, a serial port, a keyboard port, a mouse port, or the like.

The programs executed by the CPU 902 are stored in the flexible disk 993, the CD-ROM 992, or a recording medium such as an integrated circuit (IC) card and provided to users. The programs stored in the recording medium may be compressed or not. The programs are installed from the recording medium into the hard disk drive 908, read by the RAM 903, and executed by the CPU 902. The programs executed by the CPU 902 cause the web server 110 to function as the component information storage unit 111, the tool information storage unit 112, the maintenance type information storage unit 113, the mechanism drawing data storage unit 114, the work flow data storage unit 115, the access request data receiving unit 116, the mechanism selection page generating unit 117, the selected mechanism data receiving unit 118, the selected component data receiving unit 119, the maintenance type specifying unit 120, the dismounted component specifying unit 121, the replacement component specifying unit 122, the tool specifying unit 123, the sales page generating unit 124, the work flow page generating unit 125, the estimate calculating unit 126, the estimate page generating unit 127, and the web page transmitting unit 128 described in relation to FIGS. 1 to 15.

The programs described above may be stored in an external storage medium. As the storage medium, in addition to the flexible disk 993 and the CD-ROM 992, an optical recording medium such as a digital versatile disk (DVD) or a phase disk (PD), an opto-magnetic recording medium such as a MiniDisk (MD), a tape medium, a semiconductor memory such as an IC card, or the like can be used. Moreover, the component sales system 100 may be provided as a networked program using a storage medium such as a hard disk or a RAM provided in a server system connected to a dedicated communication network or the Internet as a recording medium.

While the embodiment of the present invention has been described, the technical scope of the invention is not limited to the above described embodiment. It is apparent to persons skilled in the art that various alterations and improvements can be added to the above-described embodiment. It is also apparent from the scope of the claims that embodiments added with such alterations or improvements can be included in the technical scope of the invention.

INDUSTRIAL APPLICABILITY

The present invention can be applied to a component sales system that sells a plurality of components at an electronic store and an electronic store providing device that provides the electronic store to a customer terminal used by a customer.

REFERENCE SIGNS LIST

100: COMPONENT SALES SYSTEM
110: WEB SERVER
111: COMPONENT INFORMATION STORAGE UNIT
112: TOOL INFORMATION STORAGE UNIT
113: MAINTENANCE TYPE INFORMATION STORAGE UNIT
114: MECHANISM DRAWING DATA STORAGE UNIT
115: WORK FLOW DATA STORAGE UNIT
116: ACCESS REQUEST DATA RECEIVING UNIT
117: MECHANISM SELECTION PAGE GENERATING UNIT
118: SELECTED MECHANISM DATA RECEIVING UNIT
119: SELECTED COMPONENT DATA RECEIVING UNIT
120: MAINTENANCE TYPE SPECIFYING UNIT
121: WORK SCOPE SPECIFYING UNIT
122: OTHER COMPONENT SPECIFYING UNIT
123: TOOL SPECIFYING UNIT
124: SALES PAGE GENERATING UNIT
125: WORK FLOW PAGE GENERATING UNIT
126: ESTIMATE CALCULATING UNIT
127: ESTIMATE PAGE GENERATING UNIT
128: WEB PAGE TRANSMITTING UNIT
130: CLIENT
140: COMMUNICATION LINE
901: HOST CONTROLLER
902: CPU
903: RAM
904: GRAPHIC CONTROLLER
905: DISPLAY DEVICE
906: INPUT/OUTPUT CONTROLLER
907: COMMUNICATION INTERFACE
908: HARD DISK DRIVE
909: CD-ROM DRIVE
910: ROM
911: FLEXIBLE DISK DRIVE
912: INPUT/OUTPUT CHIP
991: NETWORK COMMUNICATION DEVICE
992: CD-ROM
993: FLEXIBLE DISK

What is claimed is:

1. A component sales system that sells, at an electronic store, a plurality of components that constitutes each of a plurality of mechanisms constituting a machine, the component sales system comprising:
an electronic store providing device that provides the electronic store through a communication line to a customer terminal used by a customer,
wherein the electronic store providing device includes:
a selected component data receiving unit that receives a data of representing one component selected by the customer among a plurality of components constituting one of the mechanisms, from the customer terminal;
a maintenance type specifying unit that specifies the type of maintenance for replacing a component represented by the data received by the selected component data receiving unit;
a dismounted component specifying unit that specifies other components dismounted together with the component at the scope of a work for replacing the component represented by the data received by the selected component data receiving unit among works included in the maintenance type specified by the maintenance type specifying unit;
a replacement component specifying unit that specifies a component needs to be replaced together among the components specified by the dismounted component specifying unit;
a sales page generating unit that generates a web page for selling the component represented by the data received by the selected component data receiving unit and the component specified by the replacement component specifying unit, to the customer; and a web page transmitting unit that transmits the web page generated by the sales page generating unit to the customer terminal which is a source of the data received by the selected component data receiving unit.

2. The component sales system according to claim 1, wherein the sales page generating unit generates a web page configured to allow the customer to understand each of the component represented by the data received by the selected component data receiving unit and the component specified by the replacement component specifying unit corresponds to which component among the components constituting in which mechanism.

3. The component sales system according to claim 1, wherein the electronic store providing device further includes a tool specifying unit that specifies a tool needs to be prepared to dismount the component represented by the data received by the selected component data receiving unit and the components specified by the dismounted component specifying unit, and wherein the sales page generating unit generates a web page for selling the tool specified by the tool specifying unit concurrently to the customer.

4. The component sales system according to claim 1, wherein the electronic store providing device further includes a work flow page generating unit that generates a web page including digital contents representing the flow of a work at the maintenance type specified by the maintenance type specifying unit, and wherein the web page transmitting unit transmits the web page generated by the work flow page generating unit additionally to the customer terminal corresponding to the transmission source of the data received by the selected component data receiving unit.

5. The component sales system according to claim 1, wherein the electronic store providing device further includes an estimate calculating unit that calculates an estimate for the work of replacing the components using the price of the component represented by the data received by the selected component data receiving unit and the price of the component specified by the replacement component specifying unit, and an estimate page generating unit that generates a web page for presenting information on the estimate calculated by the estimate calculating unit to the customer, and wherein the web page transmitting unit transmits the web page generated by the estimate page generating unit concurrently to the customer terminal corresponding to the transmission source of the data received by the selected component data receiving unit.

6. The component sales system according to claim 5, wherein the estimate calculating unit calculates the estimate by further using the price of the tool specified by the tool specifying unit.

7. The component sales system according to claim 5, wherein the estimate calculating unit calculates the estimate further using working hours required for the maintenance, determined based on the maintenance type specified by the maintenance type specifying unit.

8. An electronic store providing device configured as a computer that provides, through a communication line, an electronic store that sells a plurality of components that constitutes each of a plurality of mechanisms constituting a machine to a customer terminal used by a customer, the computer comprising:

a selected component data receiving unit by which the computer receives a data of representing one component selected by the customer among a plurality of components constituting one of the mechanisms, from the customer terminal;

a maintenance type specifying unit by which the computer specifies the type of maintenance for replacing a component represented by the data received by the selected component data receiving unit;

a dismounted component specifying unit by which the computer specifies other components dismounted together with the component at the scope of a work for replacing the component represented by the data received by the selected component data receiving unit among works included in the maintenance type specified by the maintenance type specifying unit;

a replacement component specifying unit by which the computer specifies a component needs to be replaced together among the components specified by the dismounted component specifying unit;

a sales page generating unit by which the computer generates a web page for selling the component represented by the data received by the selected component data receiving unit and the component specified by the replacement component specifying unit, to the customer; and a web page transmitting unit by which the computer transmits the web page generated by the sales page generating unit to the customer terminal which is a source of the data received by the selected component data receiving unit.

9. A control method for controlling an electronic store providing device configured as a computer that provides, through a communication line, an electronic store that sells a plurality of components that constitutes each of a plurality of mechanisms constituting a machine to a customer terminal used by a customer, the control method comprising:

a selected component data receiving step of receiving by the computer a data of representing one component selected by the customer among a plurality of components constituting one of the mechanisms, from the customer terminal;

a maintenance type specifying step of specifying by the computer the type of maintenance for replacing a component represented by the data received in the selected component data receiving step;

a dismounted component specifying step of specifying by the computer other components removed together with the component at the scope of a work for replacing the component represented by the data received in the selected component data receiving step among works included in the maintenance type specified in the maintenance type specifying step;

a replacement component specifying step of specifying by the computer a component needs to be replaced together among the components specified in the dismounted component specifying step;

a sales page generating step of generating by the computer a web page for selling the component represented by the data received in the selected component data receiving step and the component specified in the replacement component specifying step, to the customer; and a web page transmitting step of transmitting by the computer the web page generated in the sales page generating step to the customer terminal which is a source of the data received in the selected component data receiving step.

10. A non-transitory computer-readable storage medium storing a program for an electronic store providing device, the electronic store providing device configured as a computer that provides, through a communication line, an electronic store that sells a plurality of components that constitutes each of a plurality of mechanisms constituting a machine to a customer terminal used by a customer, the program when executed by the computer causes the computer to function as:

- a selected component data receiving unit that receives a data of representing one component selected by the customer among a plurality of components constituting one of the mechanisms, from the customer terminal;
- a maintenance type specifying unit that specifies the type of maintenance for replacing a component represented by the data received by the selected component data receiving unit;
- a dismounted component specifying unit that specifies other components dismounted together with the component at the scope of a work for replacing the component represented by the data received by the selected component data receiving unit among works included in the maintenance type specified by the maintenance type specifying unit;
- a replacement component specifying unit that specifies a component needs to be replaced together among the components specified by the dismounted component specifying unit;
- a sales page generating unit that generates a web page for selling the component represented by the data received by the selected component data receiving unit and the component specified by the replacement component specifying unit, to the customer; and
- a web page transmitting unit that transmits the web page generated by the sales page generating unit to the customer terminal which is a source of the data received by the selected component data receiving unit.

* * * * *